US012099321B2

(12) United States Patent
Yamamoto et al.

(10) Patent No.: US 12,099,321 B2
(45) Date of Patent: Sep. 24, 2024

(54) IMAGE FORMING SYSTEM

(71) Applicant: CANON KABUSHIKI KAISHA, Tokyo (JP)

(72) Inventors: Naoyuki Yamamoto, Chiba (JP); Kenichiro Kitajima, Ibaraki (JP); Yoshiro Tsukada, Chiba (JP); Tohru Nakaegawa, Chiba (JP); Kota Mori, Chiba (JP); Shuichi Tamura, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/365,293

(22) Filed: Aug. 4, 2023

(65) Prior Publication Data

US 2024/0085843 A1 Mar. 14, 2024

(30) Foreign Application Priority Data

Sep. 13, 2022 (JP) ................................ 2022-145109

(51) Int. Cl.
*G03G 21/20* (2006.01)
*G03G 15/00* (2006.01)
*G03G 15/20* (2006.01)

(52) U.S. Cl.
CPC ..... *G03G 15/6517* (2013.01); *G03G 15/2017* (2013.01); *G03G 2215/00877* (2013.01)

(58) Field of Classification Search
CPC ........... G03G 15/2017; G03G 15/2021; G03G 15/2039; G03G 15/6517; G03G 2215/00877
USPC .......................................... 399/69, 389, 407
See application file for complete search history.

(56) References Cited

U.S. PATENT DOCUMENTS

| | | | | |
|---|---|---|---|---|
| 7,088,933 | B2 | 8/2006 | Kitajima | |
| 7,122,769 | B2 | 10/2006 | Nami | |
| 7,132,631 | B2 | 11/2006 | Nami | |
| 7,840,150 | B2 * | 11/2010 | Mori | G03G 15/2021 399/68 |
| 8,139,971 | B2 | 3/2012 | Yamamoto | |
| 11,635,724 | B2 | 4/2023 | Kabata | |
| 2013/0323479 | A1 * | 12/2013 | Kobayashi | G03G 7/0046 428/212 |
| 2021/0017424 | A1 | 1/2021 | Ishizuka | |

(Continued)

FOREIGN PATENT DOCUMENTS

| | | | |
|---|---|---|---|
| JP | 2007-193004 | A | 8/2007 |
| JP | 2014-035454 | A | 2/2014 |

(Continued)

*Primary Examiner* — Hoang X Ngo
(74) *Attorney, Agent, or Firm* — Venable LLP

(57) ABSTRACT

An image forming system includes an image forming apparatus including a fixing unit, a folding processing portion, and a pressure-bonding portion. A first recording material having a first basis weight is fixed at a first temperature by the fixing unit and then is pressure-bonded by the pressure-bonding portion after a lapse of a first period. A second recording material having a second basis weight is fixed at a second temperature by the fixing unit and then is pressure-bonded by the pressure-bonding portion after a lapse of a second period. The second basis weight is larger than the first basis weight. The second temperature is higher than the first temperature. The second period is longer than the first period.

9 Claims, 10 Drawing Sheets

(56) References Cited

U.S. PATENT DOCUMENTS

| | | | |
|---|---|---|---|
| 2021/0017429 | A1 | 1/2021 | Ishizuka |
| 2022/0075310 | A1 | 3/2022 | Kabata |

FOREIGN PATENT DOCUMENTS

| | | | |
|---|---|---|---|
| JP | 2015-013386 | A | 1/2015 |
| JP | 2015-200712 | A | 11/2015 |
| JP | 2017-057517 | A | 3/2017 |
| JP | 2021-018425 | A | 2/2021 |
| JP | 2022-046027 | A | 3/2022 |

* cited by examiner

| | | FIXING TEMPERATURE (°C) OF FIXING DEVICE 8 | | | | | | |
|---|---|---|---|---|---|---|---|---|
| | | 140 | 150 | 160 | 170 | 180 | 190 | 200 |
| POSTEX (TWO-FOLD) 150 g/m² | PAF*1 (N/m) | 40 | 50 | 65 | 80 | 95 | 118 | 130 |
| | PAFD*2 | ○ | ○ | × | × | × | × | × |
| | TP*3 | × | × | × | ○ | ○ | ○ | ○ |
| POSTEX (THREE-FOLD) 100 g/m² | PAF*1 (N/m) | 45 | 60 | 82 | 102 | 120 | 132 | 148 |
| | PAFD*2 | ○ | ○ | × | × | × | × | × |
| | TP*3 | ○ | ○ | ○ | ○ | ○ | ○ | ○ |

*1 : PSEUDO ADHESIVE FORCE
*2 : PSEUDO ADHESIVE FORCE DISCRIMINATION
*3 : TONER PEELING

FIG. 3

| | | PRESSURE-BONDING ROLLER PAIR TEMPERATURE (°C) | | | | |
|---|---|---|---|---|---|---|
| | | 23 | 30 | 40 | 50 | 60 |
| POSTEX (THREE-FOLD) 100 g/m2 | PAF*1 (N/m) | 45 | 48 | 53 | 63 | 78 |
| | PAFD*2 | ○ | ○ | ○ | × | × |

*1 : PSEUDO ADHESIVE FORCE

*2 : PSEUDO ADHESIVE FORCE DISCRIMINATION
PSEUDO ADHESIVE FORCE OF 40N/m TO 60N/m IS EVALUATED AS "○".

FIG. 9

IMAGE FORMING SYSTEM

FIELD OF THE INVENTION AND RELATED ART

The present invention relates to an image forming system for preparing a pressure-bonding print by forming a toner image on a recording material, folding (bending) the recording material on which the toner image is formed, and pressure-bonding the folded recording material.

Conventionally, the image forming system for preparing the pressure-bonding print has been proposed (Japanese Laid-Open Patent Application (JP-A) 2014-35454). As the pressure-bonding print, it is possible to cite, for example, a pressure-bonding postcard such that opposing surfaces of a recording material folded in two (hereinafter, the opposing surfaces are referred to as pressure-bonding surfaces (sides)) are superposed and pseudo-bonded together. In the case of such pressure-bonding postcard, a user cannot read the toner image, such as a character or a picture, formed on the pressure-bonding surfaces until the pressure-bonding surfaces pseudo-bonded together are peeled off from each other. Here, pseudo-bonding refers to one form of bonding such that the recording material is peelable after the bonding and is not readily bonded again after the peeling.

As an example of a type in which the pseudo-bonding is made, there is a paste type in which a recording material of a pre-paste type in which a pressure-sensitive adhesive is applied in advance on a surface thereof is used and is pseudo-bonded by folding and pressure-bonding the recording material by a pressure-bonding processing apparatus (JP-A 2017-57517). However, in the case where the recording material of the pre-paste type is used, when a temperature of the recording material is excessively high during pressure-bonding, there is a liability that a pressure-bonding print strong in pseudo adhesive force to the extent such that the user becomes hard to peel off the recording material is formed. On the other hand, when the temperature of the recording material is excessively low during the pressure-bonding, there is a liability that a pressure-bonding print weak in pseudo adhesive force to the extent such that the pressure-bonding print becomes liable to be naturally peeled off is formed. As described in JP-A 2017-57517, the pseudo adhesive force may appropriately be “35 N/m to 80 N/m”, preferably “40 N/m to 60 N/m”. In order to obtain an appropriate pseudo adhesive force, the temperature of the recording material during the pressure-bonding may be “15° C. to 80° C.”, preferably “20° C. to 60° C.”.

Incidentally, in an image forming apparatus of an electrophotographic type, the recording material on which the toner image is formed is heated and pressed by a fixing device, so that the toner image is fixed on the recording material. Therefore, the recording material heated by the fixing device is fed to a pressure-bonding processing apparatus in a state in which the temperature thereof is relatively high. Therefore, in the case where the recording material of the pre-paste type is used, there was a liability that the pressure-bonding print strong in pseudo adhesive force to the extent such that the user becomes hard to peel off the recording material is formed as described above. Therefore, it would be considered that a fixing temperature of the fixing device is lowered in order to pressure-bond the recording material at the temperature in the above-described range. However, when the fixing temperature is lowered, a fixing property of the toner onto the recording material lowers, so that a part of the toner formed on one surface during peeling of the pressure-bonding print is peeled off and then is liable to move to another surface. Accordingly, it was difficult to employ that the fixing temperature is lowered.

SUMMARY OF THE INVENTION

According to an aspect of the present invention, there is provided an image forming system comprising: an image forming apparatus including an image forming unit capable of forming a toner image on a recording material having a pressure-sensitive adhesive layer on a surface thereof and a fixing unit configured to fix the toner image on the recording material; a folding processing portion provided on a side downstream of the image forming apparatus with respect to a feeding direction of the recording material and configured to fold the recording material, on which the toner image is fixed by the fixing unit, in a manner such that the surface where the pressure-sensitive adhesive layer is an inside of the recording material; and a pressure-bonding portion provided on a side downstream of the folding processing portion with respect to the feeding direction and configured to pressure-bond the recording material folded by the folding processing portion, wherein a first recording material having a first basis weight is fixed at a first temperature by the fixing unit and then is pressure-bonded by the pressure-bonding portion after a lapse of a first period, wherein a second recording material having a second basis weight is fixed at a second temperature by the fixing unit and then is pressure-bonded by the pressure-bonding portion after a lapse of a second period, and wherein the second basis weight is larger than the first basis weight, the second temperature is higher than the first temperature, and the second period is longer than the first period.

Further features of the present invention will become apparent from the following description of exemplary embodiments with reference to the attached drawings.

BRIEF DESCRIPTION OF THE DRAWINGS

FIG. 3 is a table showing a fixing temperature, a pseudo adhesive force, and occurrence or non-occurrence of toner peeling.

FIG. 9 is a table showing a relationship between a temperature of a pressure-bonding roller pair and a pseudo adhesive force.

DESCRIPTION OF THE EMBODIMENTS

First Embodiment

<Image Forming System>

In the following, a first embodiment will be described. First, an image forming system 1X of the first embodiment will be described. The image forming system 1X of this embodiment includes an image forming apparatus 100 capable of executing an operation in an image forming mode for forming a toner image on a recording material S and a pressure-bonding processing apparatus 200 capable of executing an operation in a pressure-bonding processing made for subjecting the recording material S, on which the toner image is formed by the image forming apparatus 100, to pressure-bonding processing. The pressure-bonding processing apparatus 200 is a post-step unit retrofittable to the image forming apparatus 100 for expanding function, and the image forming apparatus 100 and the pressure-bonding processing apparatus 200 are connected to each other so as to be capable of delivering the recording material S therebetween. This image forming system 1X is capable of preparing a pressure-bonding print such as a pressure-bonding postcard by feeding the recording material S, on which the image is formed by the image forming apparatus 100, to the pressure-bonding processing apparatus 200 and then by folding and pressure-bonding the recording material S by the pressure-bonding processing apparatus 200.

Figure 1:
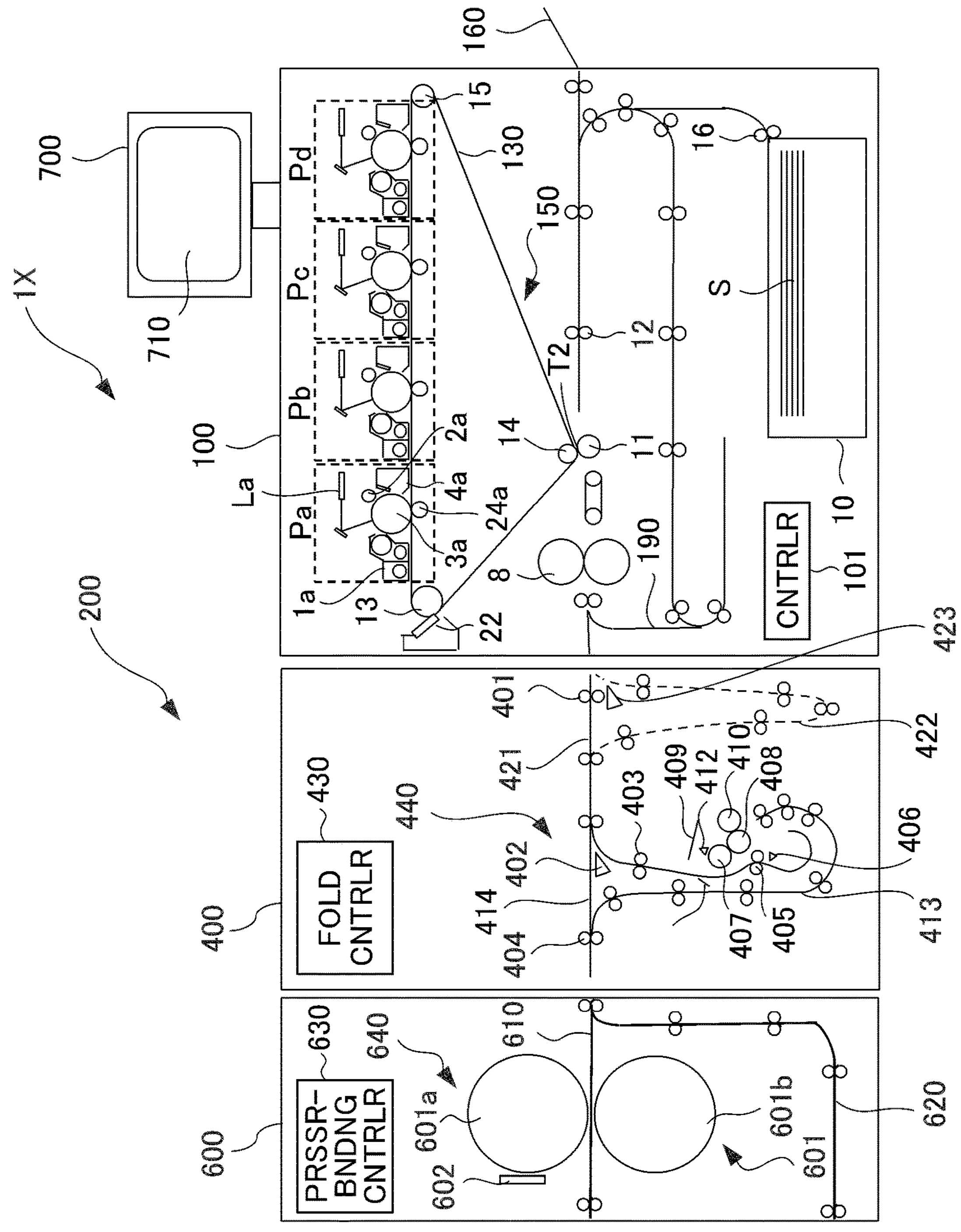
FIG. 1 is a schematic view showing an image forming system of a first embodiment.

In FIG. 1, as the pressure-bonding processing apparatus 200, an apparatus including a folding processing apparatus 400, and a pressure-bonding apparatus 600 was shown as an example. The folding processing apparatus 400 is disposed on a side downstream of the image forming apparatus 100 with respect to a feeding direction of the recording material S, and the pressure-bonding apparatus 600 is disposed on a side downstream of the folding processing apparatus 400 with respect to the feeding direction of the recording material S. The image forming apparatus 100, the folding processing apparatus 400, and the pressure-bonding apparatus 600 are connected to each other by input/output interfaces (not shown) capable of serial communication or parallel communication.

<Image Forming Apparatus>

The image forming apparatus 100 will be described. The image forming apparatus 100 is an electrophotographic full-color printer of a tandem type. The image forming apparatus 100 includes image forming portions Pa, Pb, Pc, and Pd for forming images of yellow, magenta, cyan, and black, respectively. As shown in FIG. 1, the image forming apparatus 100 forms a toner image on the recording material S on the basis of image data sent from an original reading device (not shown) connected to an apparatus main assembly or from an external device such as a personal computer or an external controller connected to the apparatus main assembly so as to be capable of inputting and outputting data.

In the case of this embodiment, the image data includes information on a first toner image formed on one surface (side) of the recording material S, information on a second toner image formed on the other surface (side) of the recording material S, information on a manner of folding (for example, a folding position depending on a size of the recording material S) or on pressure-bonding surfaces (surfaces on a valley folding side), and the like information.

As shown in FIG. 1, the image forming portions Pa, Pb, Pc, and Pd are juxtaposed along a movement direction of the intermediary transfer belt 130 in the apparatus main assembly. The intermediary transfer belt 130 is stretched by a plurality of rollers (13, 14, 15) and is rotated. Then, the intermediary transfer belt 130 carries and feeds a toner image primary-transferred in a manner described later. At a position opposing, through the intermediary transfer belt 130, an inner secondary transfer roller 14 stretching the intermediary transfer belt 130, an outer secondary transfer roller 11 is disposed, so that a secondary transfer portion T2 where the toner image on the intermediary transfer belt 130 is transferred onto the recording material S is formed. On a side downstream of the secondary transfer portion T2 with respect to a recording material feeding direction, a fixing device 8 is provided.

At a lower portion of the image forming apparatus 100, a cassette 10 in which recording materials S are accommodated. The recording material S is fed from the cassette 10 toward a registration roller pair 12 by a feeding roller 16. Thereafter, the registration roller pair 12 is started to be rotated in synchronism with the toner image formed on the intermediary transfer belt 130, so that the recording material S is fed toward the secondary transfer portion T2. A plurality of cassettes 10 capable of accommodating the recording materials S different in size and thickness are provided, and the recording material S selected by a user is fed from either one of the plurality of cassette 10. Incidentally, the recording material S is not limited to the recording material S accommodated in the cassette 10, but the recording material S stacked on a manual feeding tray 160 may also be fed. Further, a constitution in which the recording material S accommodated in an unshown sheet feeding apparatus which is used as an option and which is connected, as a casing different from the image forming apparatus 100 is conveyed to the image forming apparatus 100 may be employed.

The four image forming portions Pa, Pb, Pd, and Pd included in the image forming apparatus 100 have a substantially same constitution except that development colors are different from each other. Accordingly, in this embodiment, as a representative, the image forming portion Pa for yellow will be described, and other image forming portions Pb, Pc, and Pd will be omitted from illustration and description.

In the image forming portion Pa for yellow, a cylindrical photosensitive drum 3*a* is provided as a photosensitive member. The photosensitive drum 3*a* is rotationally driven in a predetermined direction at a predetermined process speed. At a periphery of the photosensitive drum 3*a*, a charging device 2*a*, an exposure device La, a developing device 1*a*, a primary transfer roller 24*a*, and a drum cleaning device 4*a* are provided.

A process for forming, for example, a full-color image by the image forming apparatus 100 will be described. First, when an image forming operation is started, a surface of the rotating photosensitive drum 3*a* is electrically charged uniformly by the charging device 2*a*. The charging device 2*a* is a corona charger or the like for charging the photosensitive drum 3*a* to a uniform negative dark-portion potential by irradiating the photosensitive drum 3*a* with charge particles with corona discharge, for example. Then, the photosensitive drum 3*a* is subjected to scanning exposure to laser light which is emitted from the exposure device La and which corresponds to an image signal. By this, an electrostatic latent image depending on the image signal is formed on the surface of the photosensitive drum 3*a*. The electrostatic latent image formed on the photosensitive drum 3*a* is developed into a toner image which is a visible image by a developer, containing toner and a carrier accommodated in the developing device 1*a*.

In the case of this embodiment, in the developing device 1*a*, as the developer, a two-component developer containing non-magnetic toner and a magnetic carrier is used. The toner contains a binder resin, a colorant, and a parting agent (wax). As the binder resin, a known binder resin can be used. For example, it is possible to use resin materials such as a vinyl copolymer represented by a styrene-(meth)acrylic copolymer, a polyester resin, a hybrid resin obtained by chemically bonding a vinyl copolymer unit and a polyester unit to each other, an epoxy resin, a styrene-butadiene copolymer, and the like. As the colorant, it is possible to use known colorants for yellow, magenta, cyan, and black, respectively.

As the parting agent, for example, it is possible to cite aliphatic hydrocarbon wax such as low-molecular weight polyethylene, low-molecular weight olefin copolymer wax, microcrystallin wax, Fischer-Tropsch wax, and paraffin wax; oxide of aliphatic hydrocarbon wax such as oxidized polyethylene wax; their block copolymers; waxes principally containing fatty acid esters such as carnauba wax and montanic acid ester wax; ester wax which is synthetic reaction product between higher aliphatic acid, such as behenyl behenate or behenyl stearate, and higher alcohol; fatty acid esters a part or all of which is deoxidized, such as deoxidized carnauba wax; and the like.

The toner image formed on the photosensitive drum 3*a* is transferred onto the intermediary transfer belt 130 at a primary transfer portion formed between the intermediary transfer belt 130 and the photosensitive drum 3*a* opposing the primary transfer roller 24*a*. At this time, to the primary transfer roller 24*a*, a primary transfer bias (voltage) is applied. After the transfer on the intermediary transfer belt 130, toner remaining on the surface of the photosensitive drum 3*a* is removed by the drum cleaning device 4*a*.

Such an operation is sequentially performed in the image forming portions Pa, Pb, Pc, and Pd for yellow, magenta, cyan and black, respectively, so that four color toner images are superposed on the intermediary transfer belt 130. Thereafter, in synchronism with toner image forming timing, the recording material S accommodated in the cassette 10 is fed to the secondary transfer portion T2. Then, by applying a secondary transfer bias (voltage) to the outer secondary transfer roller 11, the toner images for a full-color image are collectively secondary-transferred onto the recording material S. Toner remaining on the intermediary transfer belt 130 after the transfer on the recording material S is removed by a belt cleaning device 22. Incidentally, in the case of this embodiment, an image forming unit 150 as an image forming unit capable of forming the toner images on the recording material S is constituted by the image forming portions Pa to Pd, the intermediary transfer belt 130, the rollers (13, 14, 15), the outer secondary transfer roller 11, and the like.

The recording material S on which the toner images are formed is fed toward the fixing device 8 as a fixing unit. The fixing device 8 includes a fixing roller and a pressing roller, and at a fixing nip formed by the fixing roller and the pressing roller, the fixing device 8 nips and feeds the recording material S on which the toner image is formed and thus is capable of heating and pressing the recording material S, so that the toner image can be fixed on the recording material S.

The image forming apparatus 100 of this embodiment is capable of performing double-side printing. During an operation in a single-side image forming mode, the recording material S on which the toner image is fixed on one surface side by the fixing device 8 is conveyed to the pressure-bonding processing apparatus 200. During an operation in a double-side image forming mode, the recording material S on which the toner image is fixed on the one surface side by the fixing device 8 is conveyed toward a double-side reverse feeding portion 190. In the double-side feeding portion 190, the recording material S is reversed while being conveyed, so that a front surface (double-side) and a back surface (second surface) of the recording material S are replaced with each other. Then, the recording material S is fed toward the registration roller pair 12 through the double-side feeding portion 190. Then, the recording material S is fed by the registration roller pair 12 toward the secondary transfer portion T2 in a state in which the back surface side (second surface side) thereof where printing has not been carried out faces the intermediary transfer belt 130 side. At the secondary transfer portion T2, the toner images for a full-color image formed on the intermediary transfer belt 130 are collectively secondary-transferred on the back surface side of the recording material S. Thereafter, the recording material S is subjected to toner image fixing by the fixing device 8 and the recording material S on which the toner image is fixed is conveyed to the pressure-bonding processing apparatus 200.

Further, the image forming apparatus 100 includes a main controller 101. In the case of this embodiment, the main controller 10 has a function as a control unit which is capable of executing an image forming step of forming the image on the recording material S, by controlling the image forming apparatus 100 and which is capable of executing a pressure-bonding processing step of subjecting the recording material S to folding and pressure-bonding by controlling the pressure-bonding processing apparatus 200. A control constitution of the image forming system X will be described later (see FIG. 3).

<Recording Material>

Next, the recording material S will be described. In this embodiment, a recording material S of a pre-paste type including a base material and a pressure-sensitive adhesive layer is used. As the base material, a base material capable of forming the pressure-sensitive adhesive layer on at least one surface may only be required, and for example, it is possible to cite high-quality paper, medium-quality paper, coated paper, and the like. Further, from a viewpoint of confidentiality, it is desirable that the base material does not transmit light and that the toner image formed on one surface is prevented from being transparent and visible on the other surface. The pressure-sensitive adhesive layer is formed with a pressure-sensitive adhesive pseudo-bonded by pressure application and includes an adhesive base material and an adhesive force adjusting agent. As the adhesive base material, for example, composition containing a natural rubber latex, a modified product thereof, a synthetic rubber latex, a synthetic resin, and the like is used. The adhesive force adjusting agent is a filler in a fine particle shape, such as a known wax of paraffin wax or the like, or silica, titanium oxide, calcium carbonate, or the like. Each of these material is low in affinity with the adhesive base material and adjusts the adhesive force as the pressure-sensitive adhesive.

The filler in the fine particle shape contained in the adhesive base material projects from the adhesive base material, whereby an uneven shape is formed on the pressure-sensitive adhesive layer surface. By this uneven shape, the adhesive base material does not appear at the surface during non-pressure application, and therefore an adhesive property is not expressed. On the other hand, when opposite surfaces on which the pressure-sensitive adhesive layer is applied are superposed and pressure-bonded to each other, the adhesive base material appears at the surface, and therefore, the adhesive property is expressed by the adhesive base material on each of the superposed surfaces. Here, when a transporting cost such a postage which is more inexpensive in a pressure-bonding postcard than in a sealed letter is taken into consideration, a basis weight of the recording material may desirably be "64 g/m 2 to 209 g/$m^2$".

<Pressure-Bonding Processing Apparatus>

Next, the pressure-bonding processing apparatus 200 will be described. As shown in FIG. 1, the pressure-bonding processing apparatus 200 in this embodiment includes the folding processing apparatus 400 as a folding unit, and the pressure-bonding apparatus 600. The folding processing apparatus 400 folds the recording material S so that an upper surface of the recording material S is an inside surface. The pressure-bonding apparatus 600 applies pressure to the folded recording material S.

In the following, the folding processing apparatus 400, and the pressure-bonding apparatus 600 will be described.

<Folding Processing Apparatus>

The folding processing apparatus 400 is an apparatus for subjecting, to folding (processing) for folding the recording material S subjected to the image forming step by the image forming apparatus 100. In this embodiment, as an example, the folding processing apparatus 400 of a roller press-contact type capable of folding the recording material S in three or two was described. In the folding processing apparatus 400, the recording material S conveyed from the image forming apparatus 100 is conveyed by a plurality of conveying (feeding) roller pairs 401 (403, 404).

The folding processing apparatus 400 includes a first feeding path (conveying path) and a second feeding path (conveying path) as feeding (conveying) passages for feeding (conveying) the recording material S from the fixing device 8 to a pressure-bonding portion 640 described later through the folding processing portion 440. In the case of this embodiment, the first feeding path has a length, which is a first length, of the feeding passage from the fixing device 8 to the pressure-bonding portion 640 through the folding processing portion 440. The second feeding path has a length of the feeding passage, which is a second length longer than the first length. Specifically, the first feeding path includes a first passage portion 421 along which the recording material S is conveyed and the folding processing portion 440 on a side downstream of the first passage portion 421 with respect to the recording material feeding direction. The second feeding path includes a second passage portion 422 along which the recording material S is conveyed and the folding processing portion 440 on a side downstream of the second passage portion 422 with respect to the (recording material) feeding direction. Further, the second passage portion 422 is longer than the first passage portion 421 in length of the passage along which the recording material S is conveyed. In the case where a pressure-bonding print is prepared, the feeding passage of the recording material S is switched to either one of the first feeding path and the second feeding path by a switching flapper 423 as a switching portion, and the recording material S passes through the folding processing portion 440 and is conveyed to the pressure-bonding apparatus 600. This will be described later.

In the folding portion 440, folding processing for folding the recording material S is carried out.

As regards an operation of the folding portion 440, an example of folding processing (for example, outward three-fold processing) in which the recording material S is folded two times in a Z-character form will be described. The recording material S is sorted into separate feeding paths by a flapper 402 depending on whether or not the folding processing is needed. In the case where the pressure-bonding print is prepared, the recording material S is sorted into a folding processing path 413, and in the case where the pressure-bonding print is not prepared, the recording material S is sorted into a folding (processing) avoidance path 414.

In the case where the recording material S is sorted into the folding processing path 413, the recording material S is subjected to registration correction such that the recording material S is once stopped at a position of a registration roller pair 405 and a loop is formed. The recording material S subjected to the registration correction is fed again, and at a predetermined timing after the recording material S passes through a folding position detecting sensor 406, the recording material S is subjected to first folding processing simultaneously with drawing of the recording material S by a first folding roller pair 407 and a second folding roller pair 408. Then, when the drawn recording material P abuts against an abutment stopper 409, the recording material S is subjected to second folding processing simultaneously with drawing of the recording material S by the second folding roller pair 408 and a third folding roller pair 410. Thus, the recording material S is folded in a first fold on a first surface side so that superposition surfaces on the first side where the pressure-sensitive adhesive layer was formed are superposed on each other and is folded in a second fold on a second surface side so that superposition surfaces on the second side where the pressure-sensitive adhesive layer was formed are superposed on each other. Then, the recording material S subjected to the second folding processing is conveyed toward the discharging roller pair 404 and is delivered to a subsequent pressure-bonding apparatus 600 by the discharging roller pair 404. Incidentally, in the case where the recording material S is sorted into the folding avoidance path 414, the recording material S is not subjected to the above-described three-fold processing, and is delivered to the subsequent pressure-bonding apparatus 600 by the discharging roller pair 404.

As regards an operation of the folding processing portion 440, an example of two-fold processing will be described. In the case where the recording material S is sorted into the folding processing path 413, the recording material S is subjected to the registration correction and then is fed again similarly as in the case of the above-described three-fold processing. Then, in the case of the two-fold processing, the recording material S is drawn by the first folding roller pair 407 and the second folding roller pair 408 and passes through the folding position detecting sensor 406, and thereafter, when a trailing end of the recording material S abuts against a trailing end abutment stopper 411, the recording material S is subjected to the folding processing. The recording material S is folded in two in a fold so that the surface portions on which the pressure-sensitive adhesive layer was formed are superposed on each other. At this time, the drawn recording material S is guided by a leading end guide 412 moved to a predetermined position in advance, and thus is drawn by the second folding roller pair 408 and the third folding roller pair 410. The recording material S drawn by the second folding roller pair 408 and the third folding roller pair 410 is conveyed toward the discharging roller pair 404 and is delivered to the subsequent pressure-bonding apparatus 600 by the discharging roller pair 404. Incidentally, in the case where the recording material S is sorted into the folding avoidance path 414, the recording material S is not subjected to the above-described two-fold processing, and is delivered to the subsequent pressure-bonding apparatus 600 by the discharging roller pair 404. Further, in this embodiment, in the case where the recording material S on which the toner images are formed on double (both) surfaces (sides) is conveyed, the recording material S is subjected to the two-fold processing by being folded in a valley so that second surface side portions, i.e., surfaces (sides) where the toner image is formed later oppose each other.

<Pressure-Bonding Apparatus>

Next, the pressure-bonding apparatus 600 will be described. The pressure-bonding apparatus 600 is an apparatus for subjecting, to pressure-bonding for pressure-bonding the recording material S, the recording material S subjected to a folding processing step by the pressure-bonding apparatus 400. In this embodiment, as an example, the pressure-bonding apparatus 600 of a roller press-contact type capable of pressure-bonding processing of the recording material S by applying heat and pressure to the recording material S through the pressure-bonding roller pair nipping and conveying the recording material S was described. The pressure-bonding apparatus 600 includes a pressure-bonding processing controller 630, and a pressure-bonding portion 640 for pressure-bonding the recording material S.

The recording material S conveyed from the folding processing apparatus 400 to the pressure-bonding apparatus 600 is sorted into separate feeding paths by an unshown flapper depending on whether or not the folding processing is needed. In the case where the pressure-bonding of the recording material S is performed, the recording material S is sorted into a pressure-bonding path 610 toward the pressure-bonding portion 640 and is subjected to pressure-bonding in the pressure-bonding portion 640, and then is discharged to an outside of the pressure-bonding apparatus 600. In the case where the pressure-bonding of the recording material S is not performed, the recording material is stored into a pressure-bonding avoiding path 620 avoiding the pressure-bonding portion 640 and is not subjected to the pressure-bonding, and then is discharged to the outside of the pressure-bonding apparatus 600.

The pressure-bonding portion 640 will be described. The pressure-bonding portion 640 includes a pressure-bonding roller pair 601 for nipping and feeding the recording material S by rotation. The pressure-bonding roller pair 601 includes an upper roller 601*a* as a first rotatable member and a lower roller 601*b* as a second rotatable member for pressing the upper roller 601*a*. The lower roller 601*b* forms a nip for pressure-bonding the recording material S between itself and the upper roller 601*a* while nipping and feeding the recording material S therebetween. Accordingly, the upper roller 601*a* and the lower roller 601*b* are capable of applying heat and pressure to the recording material S while nipping and feeding the recording material S in a folded state. By this, the recording material S folded so that the pressure-sensitive adhesive layer is positioned inside thereof is subjected to pseudo-bonding by being pressure-bonded so that region in which the pressure-sensitive adhesive layer was formed are bonded together.

Here, a pressure applied to the recording material S in the pressure-bonding portion 640 is several MPa or more, and a pressure applied to the recording material S in the fixing device 8 is about "0.1-0.5 MPa". The recording material S exhibits an adhesive property by exposure of the adhesive base material to the surface under application of a high pressure (several MPa or more). For that reason, in the fixing device 8 low in pressure, the recording material S is in a high-temperature state of "100° C. to 200° C.", but the adhesive base material is not readily exposed to the surface, and therefore, the adhesive property does not exhibit, so that the adhesive base material is not deposited.

<Control Constitution of Image Forming System>

Next, a control constitution of the image forming system 1X will be described using FIG. 2 while making reference to FIG. 1. In this embodiment, the case where the image forming apparatus 100 (specifically, the main controller 101) unitarily manages an operation instruction to the pressure-bonding processing apparatus 200 (the folding processing apparatus 400 and the pressure-bonding apparatus 600) and controls the apparatuses will be described as an example. Incidentally, in addition to the devices illustrated in FIG. 2, various devices such as motors and power sources are connected, but are not the main object of the present invention herein, and therefore, will be omitted from illustration and description.

Figure 2:
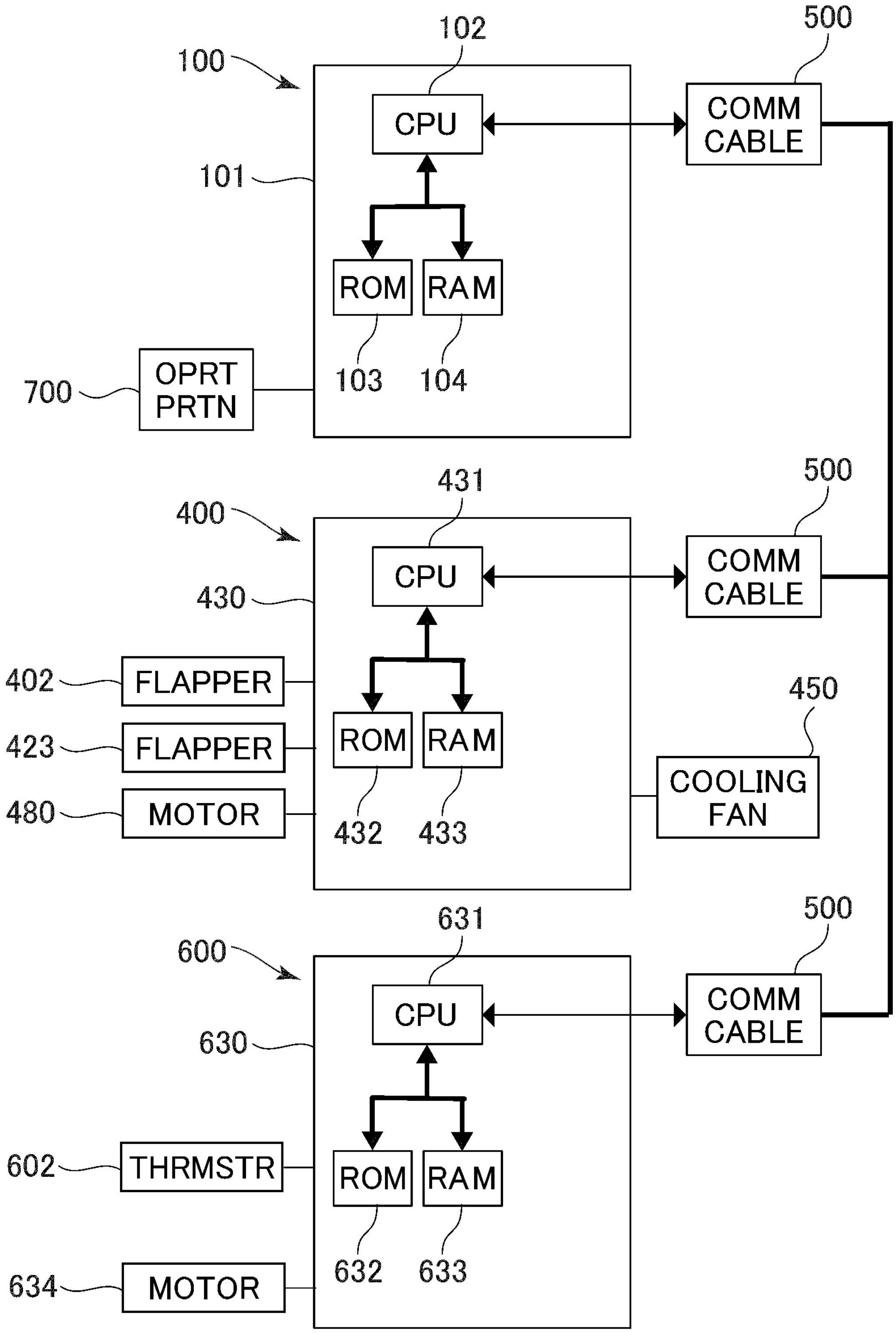
FIG. 2 is a control block diagram showing a control constitution of the image forming system.

In the image forming system 1X of this embodiment, as shown in FIG. 2, to the main controller 101, the processing controller 430 and the pressure-bonding processing controller 630 are connected via communication cables 500 so as to be capable of communicating operation instructions and various data. In accordance with the operation instructions from the main controller 101, the folding processing controller 430 causes the folding processing apparatus 400 to operate, and the pressure-bonding processing controller 630 causes the pressure-bonding apparatus 600 to operate. That is, while the main controller 101 controls the operation of the image forming apparatus 100, the main controller 101 is capable of controlling entirety of the image forming system 1X by sending the operation instructions to the pressure-bonding processing apparatus 200 (the folding processing apparatus 400 and the pressure-bonding apparatus 600).

The main controller 101, the folding processing controller 430, and the pressure-bonding processing controller 630 which are described above may have the same constitution. For example, each of the controllers includes a CPU (central processing unit), a ROM (read only memory), and a RAM (random access memory). Further, each of the controllers includes an ASIC (application specific integrated circuit).

The main controller 101 includes the CPU 102, the ROM 103, and the RAM 104. In the ROM 103 and the RAM 104, various programs and various data for a pressure-bonding print setting process (see FIG. 4) described later. Incidentally, the RAM 104 is capable of temporarily storing a calculation (computation) processing result or the like with execution of the various programs.

The image forming apparatus 100 includes an operating portion 700 including, for example, a liquid crystal display portion (see, FIG. 1), and the operating portion 700 is connected to the main controller 101. The operating portion 700 is, for example, a touch panel, and on a liquid crystal display portion 710, various screws presenting the various programs and various data or the like can be displayed. Further, the operating portion 700 receives input of a start of the various programs and input of the various data depending on a user operation such as a touch operation by the user.

The user is capable of inputting a start of an "image forming job" from the operating portion 700 and is capable of making setting for preparing the pressure-bonding print through the operating portion 700. In the case where the "image forming job" is inputted, the CPU 102 executes the pressure-bonding print setting process (program)" stored in the ROM 103. With this execution, together with the image forming apparatus 100, the pressure-bonding processing apparatus 200 (the folding processing apparatus 400 and the pressure-bonding apparatus 600) is capable of being operated.

The folding processing controller 430 includes a CPU 431, a ROM 432, and a RAM 433. The CPU 431 causes the folding processing apparatus 400 to operate on the basis of a control program stored in the ROM 432. To the folding processing controller 430, the flapper 402, the switching flapper 423, and a motor 480 for driving the plurality of feeding roller pairs 401 (403, 404) are connected.

The folding processing controller 430 makes switching of the flapper 402 or the switching flapper 423, and thus is capable of switching a part of the feeding path of the recording material S in the folding processing apparatus 400 to either one of the first feeding path and the second feeding path. Further, the folding processing controller 430 change the number of rotations of the motor 480, and thus is capable of changing feeding speeds of the recording material S by the plurality of feeding roller pairs 401 (403, 404). Incidentally, to the folding processing controller 430, as described later, a cooling fan 450 is connected in some cases.

The pressure-bonding processing controller 630 includes a CPU 631, a ROM 632, and a RAM 633. The CPU 631 causes the pressure-bonding apparatus 600 to operate on the basis of a control program stored in the ROM 632. To the pressure-bonding processing controller 630, a motor 634 for rotationally driving the pressure-bonding roller pair 601 is connected. The pressure-bonding processing controller 630 is capable of changing the number of rotations of the motor 634 by receiving a target speed of the recording material 101 from the main controller 101. Further, the pressure-bonding processing controller 630 is capable of changing the feeding path of the recording material S in the pressure-bonding apparatus 600 to either one of the pressure-bonding processing path 610 and the pressure-bonding avoiding path 620 by making the switching of an unshown flapper. Incidentally, to the pressure-bonding processing controller 630, a thermistor 602 for detecting a temperature of the pressure-bonding roller pair 601 is connected in some cases as described later.

Next, a pseudo adhesive force will be described. The present inventors conducted an experiment in which a pressure-bonding postcard was prepared using a recording material S of a pre-paste type and then the pseudo adhesive force of the prepared pressure-bonding postcard was measured. In the experiment, as the recording material S of the pre-paste type, pressure-bonding postcard sheets "POSTEX (three-fold)" (basis weight: 100 g/n$^2$) and "POSTEX (two-fold)" (basis weight: 150 g/m$^2$) manufactured by Toppan Forms Co., Ltd. were used. Further, the fixing temperature of the fixing device 8 was set at "140° C., 150° C., 160° C., 170° C., 180° C., 190° C., and 200° C.", a pressure of the pressing roller of the fixing device 8 was set at "0.5 MPa", and toner images were fixed on the pressure-bonding postcard sheets. Incidentally, a pressure by each of the first folding roller pair 407, the second folding roller pair 408, and the third folding roller pair 410 of the folding processing apparatus 400 was set at "0.8 MPa", and a pressure of the pressure-bonding roller pair 601 of the pressure-bonding apparatus 600 was set at "5 MPa".

A measuring method of the pseudo adhesive force was based on T-Peel Test in accordance with JIS K6854 (Adhesive-Determination of peel strength of bonded assemblies-). A proper pseudo adhesive force in the T-peel test is "40 N/m to 60 N/m", and presence or absence of peeling of the toner image in the T-peel test was checked by eye observation. An experiment result is shown in FIG. 3. Incidentally, in discrimination of the pseudo adhesive force shown in FIG. 3, "○" mark shows that the pseudo adhesive force is appropriate, and "x" mark shows that the pseudo adhesive force is not appropriate. In this embodiment, "40 N/m to 60 N/m" is a range of proper pseudo adhesive force.

As can be understood from FIG. 3, in the "POSTEX (three-fold)", the toner peeling did not occur at all the fixing temperatures ("○" member), and in the case where the fixing temperature is "140° C. and 150° C.", a good pseudo adhesive force was capable of being obtained ("○" mark). However, in the case where the fixing temperature is "160° C. to 200° C.", the pseudo adhesive force was excessively strong and the sheet was hard to be re-peeled ("x" mark). On the other hand, in "POSTEX (two-fold)", in the case where the fixing temperature is "140° C. and 150° C.", the good pseudo adhesive force was capable of being obtained ("○" mark), but the toner peeling occurred ("x" mark). On the other hand, in the case of "170° C. to 200° C." at which the toner peeling do not occur, the pseudo adhesive force was excessively strong, so that the sheet was hard to be re-peeled ("x" mark).

According to the above-described experiment result, in the case where the fixing temperature is high, it would be considered that the temperature of the pressure-bonding postcard sheet is excessively high during the pressure-bonding by the pressure-bonding apparatus 600 and thus the pseudo adhesive force becomes strong. However, in the case where the basis weight of the pressure-bonding postcard sheet is large, unless the fixing temperature is made higher, the toner is not sufficiently melted. If so, the toner image is hard to be fixed on the recording material S, so that when the prepared pressure-bond postcard is peeled off, the toner peeling is liable to occur. Further, when the fixing temperatures are the same, the pseudo adhesive force becomes stronger in "POSTEX (three-fold)" than in "POSTEX (two-fold)". This is because the basis weight of the "POSTEX (three-fold)" is smaller than the basis weight of the "POSTEX (two-fold)", and therefore the recording material S is fed from the fixing device 8 to the pressure-bonding apparatus 600 through the folding processing apparatus 400.

<Pressure-Bonding Print Setting Processing>

Therefore, in this embodiment, in order to prepare the pressure-bonding postcard with the proper pseudo adhesive force, the temperature of the recording material S fed from the fixing device 8 was lowered, and the pressure-bonding of the recording material S by the pressure-bonding apparatus 600 was made executable at an appropriate temperature. In a period from passing of the recording material S until the recording material S reaches the pressure-bonding apparatus 600, the temperature of the recording material S is lowered to "15° C. to 80° C.", preferably to "20° C. to 60° C.". In the following, pressure-bonding print setting processing in the first embodiment will be described using FIG. 4 while making reference to FIGS. 1 and 2. The pressure-bonding print setting processing in this embodiment is started with input of a start of on "image forming job" from, for example, the operating portion 700 by the main controller 101.

Figure 4:
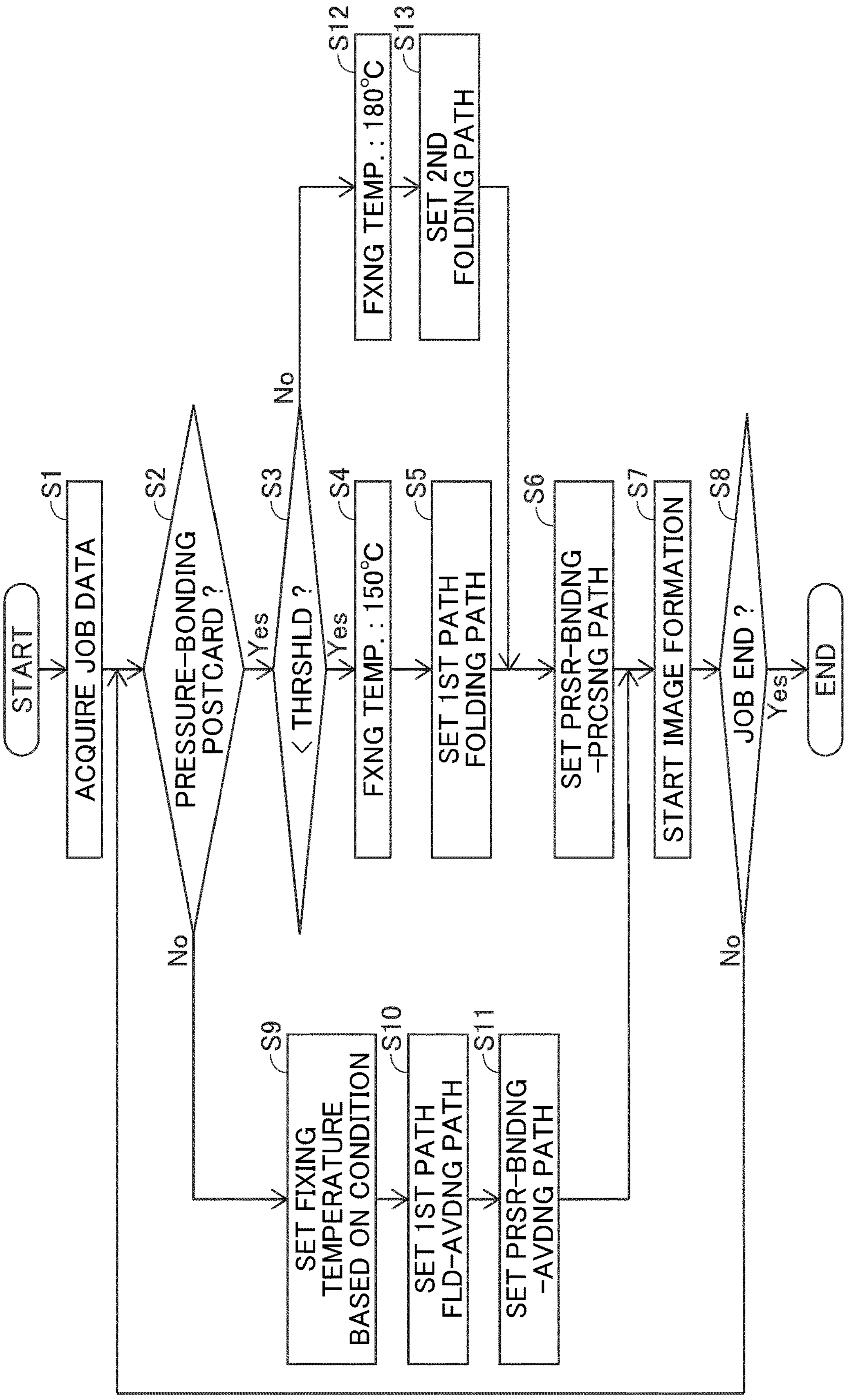
FIG. 4 is a flowchart showing pressure-bonding print setting processing in the first embodiment.

As shown in FIG. 4, the main controller 101 acquires job data sent from the operating portion 700 or the external device (51). In the job data, in addition to image data on the toner image formed on the recording material S, a kind and a basis weight of the recording material S, presence or absence of post-processing, the number of sheets outputted, and the like are set. The main controller 101 discriminate whether or not the pressure-bonding postcard is prepared (S2). For example, in the case where as the kind of the recording material S, the pressure-bonding postcard sheet is set in the job data, the main controller 101 prepares the pressure-bonding postcard as described later.

In the case where the pressure-bonding postcard is not prepared (No of S2), the main controller 101 sets the fixing temperature of the fixing device 8 on the basis of the acquired job data (S9). For example, depending on the kind and the basis weight of the recording material S (for example, plain paper of "128 g/m$^{2}$" in basis weight) and the presence or absence of the post-processing (for example, no post-processing) which are contained in the job data, the fixing temperature is set at a predetermined fixing temperature (for example, 140° C.).

Further, the main controller 101 causes the folding processing controller 430 to set the feeding path of the pressure-bonding postcard sheet to the first passage portion 421 and the folding avoiding path 414 (S10), and causes the pressure-bonding processing controller 630 to set the feeding path of the pressure-bonding postcard sheet to the pressure-bonding avoiding path 620 (S11). Then, the main controller 101 causes the image forming apparatus 100 to start image forming processing in which the toner image is formed (including fixing, the same applies to the following) on the recording material S (S7). Thereafter, the main controller 101 discriminates whether or not the image forming job is ended (S8).

In the case where the image forming job is ended (Yes of S8), the main controller 101 ends the "pressure-bonding print setting processing". In the case where the image forming job is not ended (No of S8), the main controller 101 causes the processing to return to the processing of the step S2, and repeats the processing of the above-described steps S2, S9 to S11, and S7 until the image forming job is ended. In this case, the toner image is formed on the recording material S by operating the image forming apparatus 100, while the pressure-bonding processing apparatus 200 is not operated. That is, the recording material S on which the toner image is formed is discharged without being bent (folded) and pressure-bonded, so that the pressure-bonding postcard is not prepared.

On the other hand, in the case where the pressure-bonding postcard is prepared (Yes of S2), the main controller 101 discriminates whether or not the basis weight of the pressure-bonding postcard sheet set in the job data is smaller than a threshold (for example, 129 $g/m^2$) (S3). In the case where the basis weight of the pressure-bonding postcard sheet is smaller than the threshold (for example, 129 $g/m^2$) (Yes of S3), the main controller 101 sets the fixing temperature of the fixing device 8 to "150° C." (first temperature) (S4). This fixing temperature of "150° C." is a lower-limit value at which a fixing property of the toner image is capable of being maintained in the pressure-bonding postcard sheet smaller in basis weight than the threshold. Further, the main controller 101 causes the folding processing controller 430 to set the feeding path of the pressure-bonding postcard sheet to the first passage portion 421 and the folding processing path 413, i.e., the first feeding path (S5), and causes the pressure-bonding processing controller 630 to set the feeding path of the pressure-bonding postcard sheet to the pressure-bonding processing path 610 (S6). Then, the main controller 101 carries out the processing of the steps S7 and S8 described above. Thus, the pressure-bonding postcard on which the toner image is formed is folded and pressure-bonded by the pressure-bonding processing apparatus 200, so that the pressure-bonding postcard is prepared.

In the case where the basis weight of the pressure-bonding postcard sheet is the threshold or more (No of S3), the main controller 101 sets the fixing temperature of the fixing device 8 to "180° C." (second temperature) higher than the first temperature (S12). Further, the main controller 101 causes the folding processing controller 430 to set the feeding path of the pressure-bonding postcard sheet to the second passage portion 422 and the folding processing path 413, i.e., the second feeding path (S13), and causes the pressure-bonding processing controller 630 to set the feeding path of the pressure-bonding postcard sheet to the pressure-bonding processing path 610 (S6). Then, the main controller 101 carries out the processing of the steps S7 and S8 described above. Thus, the pressure-bonding postcard on which the toner image is formed is cooled and thereafter is pressure-bonded by the pressure-bonding apparatus 600, so that the pressure-bonding postcard is prepared.

As described above, in the case where the pressure-bonding postcard is prepared using the pressure-bonding postcard sheet with the basis weight which is the threshold or more, the fixing temperature is set at "180° C.". This fixing temperature of "180° C." is a lower-limit value at which the time fixing property is capable of being maintained in the pressure-bonding postcard sheet with the basis weight which is the threshold or more, and is higher than the fixing temperature of a pressure-bonding postcard sheet with a basis weight which is smaller than the threshold. In this case, the temperature of the pressure-bonding postcard sheet passed through the fixing device 8 becomes a temperature higher than the temperature of the pressure-bonding postcard sheet with the basis weight which is smaller than the threshold.

Thus, in the case where the temperature of the pressure-bonding postcard sheet becomes high, the pressure-bonding postcard sheet is cooled b being sorted into the second passage portion 422 in the folding processing apparatus 400, and is conveyed and folded in the folding processing path 413, and then is delivered to the pressure-bonding apparatus 600.

Figure 5:
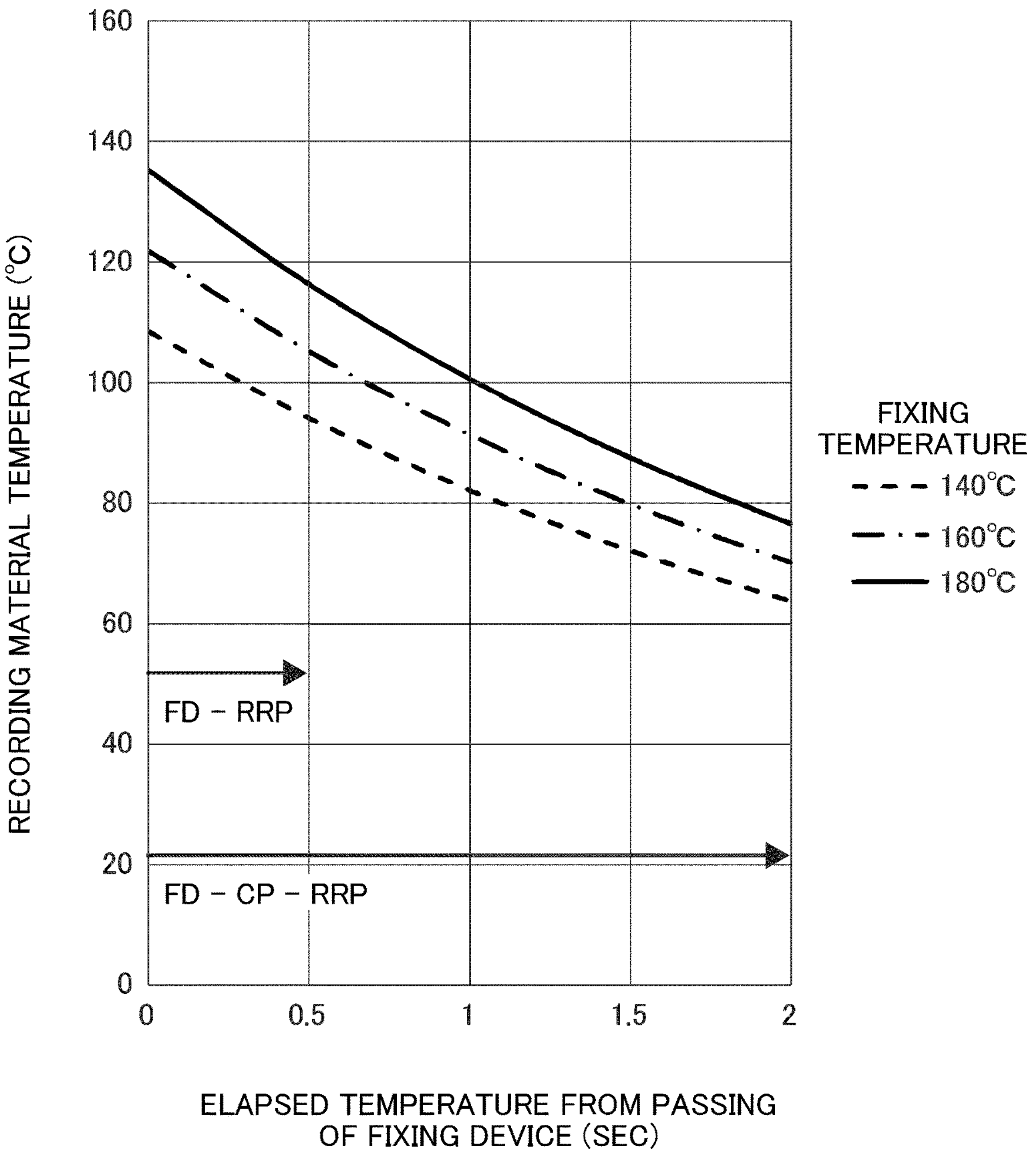
FIG. 5 is a graph showing a temperature change of a recording material from passing of the recording material through a fixing device.

Here, an example of a temperature change of the recording material S depending on an elapsed time from passage of the recording material S through the fixing device 8 is shown in FIG. 5. In this embodiment, a time from passage of the pressure-bonding postcard sheet through the fixing device 8 until the pressure-bonding postcard sheet passes through the first passage portion 421 and reaches the registration roller pair 405 of the folding processing path 413 is about "0.5 sec". On the other hand, a time from passage of the pressure-bonding postcard sheet through the fixing device 8 until the pressure-bonding postcard sheet passes through the second passage portion 422 and reaches the registration roller pair 405 of the folding processing path 413 is about "2.0 sec". As can be understood from FIG. 5, with a longer elapsed time from the passing of the recording material S through the fixing device 8, the temperature of the recording material S can be more lowered even when the fixing temperature is high.

In the case of this embodiment, a passage length of the second passage portion 422 is formed longer than the first passage portion 421 so that the temperature of the pressure-bonding postcard sheet is capable of being lowered to "20° C. to 60° C." in a time from passing of the pressure-bonding postcard sheet through the fixing device 8 until the pressure-bonding postcard sheet passes through the second passage portion 422 and the folding processing path 413 and reaches the pressure-bonding apparatus 600. When the pressure-bonding postcard sheet is conveyed along the second passage portion 422 longer in passage length, the pressure-bonding postcard sheet is cooled compared with when the pressure-bonding postcard sheet is conveyed along the first passage portion 421. Thus, the pressure-bonding postcard sheet is pressure-bonded by the pressure-bonding apparatus 600 after being cooled, so that the pressure-bonding postcard with a proper pseudo adhesive force is prepared.

As described above, in this embodiment, the folding processing apparatus 400 is provided with the second passage portion 422 longer in passage length than the first passage portion 421, and in the case where the temperature of the pressure-bonding postcard sheet becomes high, the pressure-bonding postcard sheet passed through the fixing device 8 is conveyed to the second passage portion 422. The pressure-bonding postcard sheet is conveyed to the second passage portion 422, so that a time from the fixing device 8 to arrival at the pressure-bonding portion 640 in the folding processing apparatus 400 is made long and an amount of heat dissipation from the pressure-bonding postcard sheet becomes large during the time, with the result that the temperature of the pressure-bonding postcard sheet can be lowered. Thus, the pressure-bonding postcard sheet is cooled after passed through the fixing device 8, whereby the temperature of the pressure-bonding postcard sheet can be lowered to a temperature at which a proper pseudo adhesive force can be obtained during the pressure-bonding by the pressure-bonding apparatus 600. Accordingly, it is possible to prepare the pressure-bonding print with the proper pseudo adhesive force.

Incidentally, in the above-described first embodiment, an example in which the second passage portion 422 for cooling the pressure-bonding postcard sheet is provided so as to be branched from the first passage portion 421 on a side upstream of the folding processing portion 440 with respect to the feeding direction of the recording material S was described, but the present invention is not limited thereto. For example, the second passage portion 422 is provided on side downstream of the folding processing portion 440 with respect to the feeding direction of the recording material S so that a time required to reach the pressure-bonding portion 640 from the fixing device 8 in the folding processing apparatus 400 may be made capable of being prolonged. However, after the pressure-bonding postcard sheet is subjected to the folding processing, the pressure-bonding postcard sheet is folded so that the pressure-sensitive adhesive layer of the pressure-bonding postcard sheet becomes the inside, so that the temperature of the pressure-bonding postcard sheet becomes hard to lower. For that reason, as in the above-described first embodiment, the second passage portion 422 may preferably be disposed on the side upstream of the folding processing portion 440 with respect to the feeding direction of the recording material S.

Further, when an amount of heat dissipation from the pressure-bonding postcard sheet can be made large by prolonging the time required to reach the pressure-bonding portion 640 from the fixing device 8 in the folding processing apparatus 400, the present invention is not limited to provision of the above-described second passage portion 422. For example, a time required to reach the pressure-bonding apparatus 600 from the fixing device 8 in the folding processing apparatus 400 may also be prolonged by making a feeding speed of the pressure-bonding postcard sheet slow after the pressure-bonding postcard sheet passes through the fixing device 8. In such a case, instead of the processing of the step S13 shown in FIG. 4, the number of rotations of the motor 480 (see FIG. 2) for driving the plurality of feeding roller pairs 401 (403, 404) may only be required so as to make the feeding speed of the pressure-bonding postcard sheet by the plurality of feeding roller pairs 401 (403, 404) slow. Incidentally, the slowing of the feeding speed of the pressure-bonding postcard sheet may also include that the feeding of the pressure-bonding postcard sheet is stopped. That is, the feeding of the pressure-bonding postcard sheet may be stopped by stopping the drive of the feeding roller pair 401, so that the temperature of the pressure-bonding postcard sheet may be lowered.

Second Embodiment

Figure 6:
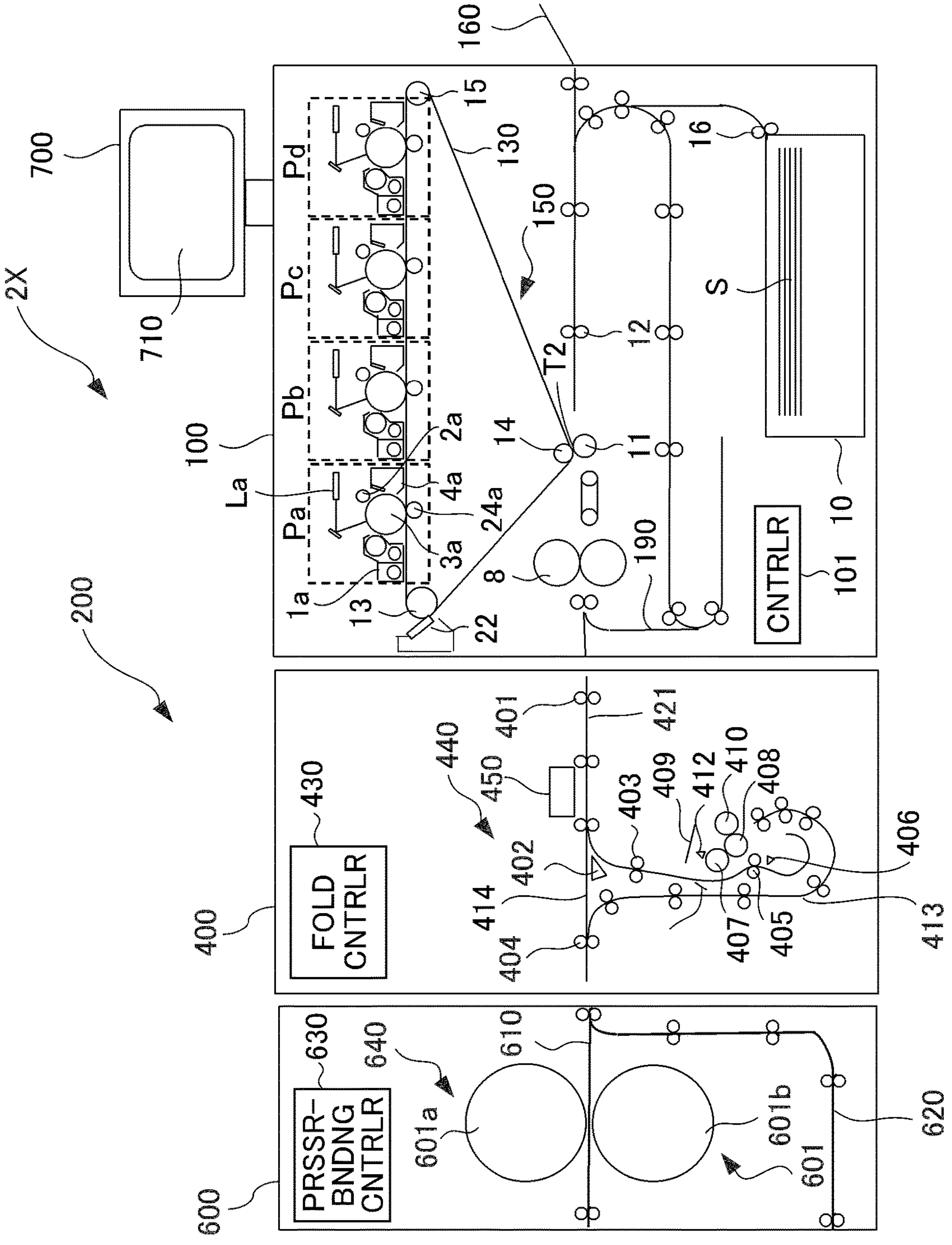
FIG. 6 is a schematic view showing an image forming system of a second embodiment.

Next, a second embodiment will be described using FIGS. 6 to 8. FIG. 6 is a schematic view showing an image forming system 2X of the second embodiment. Incidentally, in the second embodiment described in the following, the same reference numerals or symbols are added to constitutions similar to the constitutions (see FIG. 1) of the above-described first embodiment, and the same step numbers are added to processes similar to the processes (see FIG. 4) in the first embodiment, and thus will be briefly described or omitted from description.

As shown in FIG. 6, compared with the image forming system 1X of the above-described first embodiment, the image forming system 2X of the second embodiment includes a folding processing apparatus 400 provided with no second passage portion 422. For that reason, the pressure-bonding postcard sheet is conveyed along the first passage portion 421, and thereafter is sorted into the folding processing path 413 or the folding avoiding path 414 by the flapper 402 depending on whether or not the folding processing is needed. Instead of the second passage portion 422, a cooling fan 450 is provided in the folding processing apparatus 400. The cooling fan 450 as a cooling unit is disposed so as to be capable of cooling a surface of the pressure-bonding postcard sheet, where the pressure-sensitive adhesive layer is formed, conveyed along the first passage portion 421 by blowing air toward the recording material S (pressure-bonding postcard sheet) during feeding (conveyance). In the case of this embodiment, the cooling fan 450 is capable of adjusting the temperature of the pressure-bonding postcard sheet to "15° C. to 80° C.".

Figure 7:
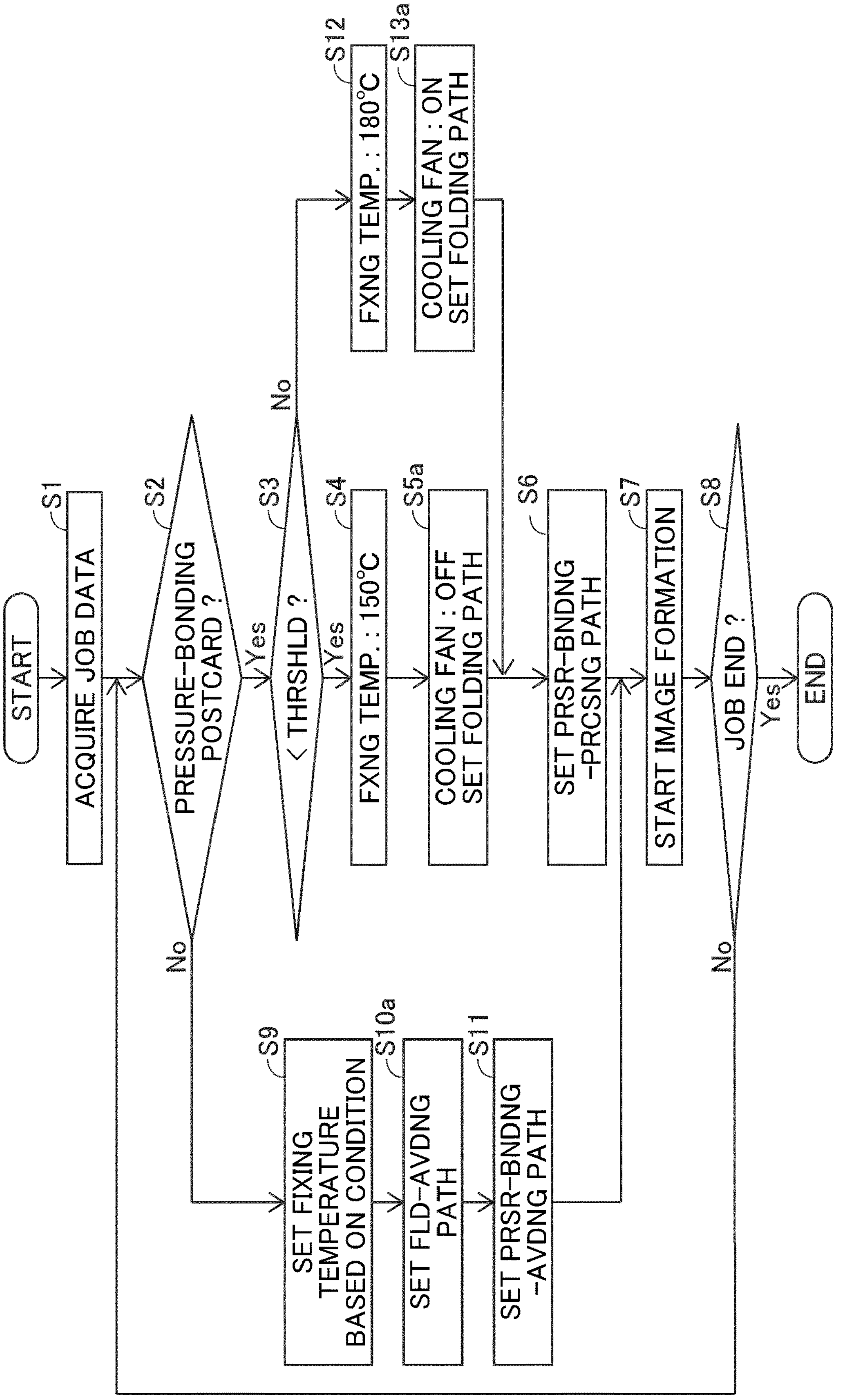
FIG. 7 is a flowchart showing pressure-bonding print setting processing in the second embodiment.

FIG. 7 is a flowchart showing pressure-bonding print setting processing in the second embodiment. As shown in FIG. 7, in the case where the pressure-bonding postcard is not prepared (No of S2), the main controller 101 sets the fixing temperature of the fixing device 8 (S9), causes the folding processing controller 430 to set the feeding path of the pressure-bonding postcard sheet to the folding avoiding path 414 (S10*a*), and causes the pressure-bonding processing controller 630 to set the feeding path of the pressure-bonding postcard sheet to the pressure-bonding avoiding path 620 (S11). On the other hand, in the case where the pressure-bonding postcard is prepared (Yes of S2), when the basis weight of the pressure-bonding postcard sheet is the threshold or more (No of S3), the main controller 101 sets the fixing temperature of the fixing device 8 at "180° C." (S12). Further, the main controller 101 causes the folding processing controller 430 to operate the cooling fan 450 by turning on the cooling fan 450 and causes the folding processing controller 430 to set the feeding path of the pressure-bonding postcard sheet to the folding processing path 413 (S13*a*). Then, the main controller 101 causes the pressure-bonding processing controller 630 to set the feeding path of the pressure-bonding postcard sheet to the pressure-bonding processing path 610 (S6), and causes the pressure-bonding processing controller 630 to start the image forming processing (S7).

On the other hand, in the case where the basis weight of the pressure-bonding postcard sheet is smaller than the threshold (Yes of S3), the main controller 101 sets the fixing temperature of the fixing temperature 8 at "150° C." (S4). Then, the main controller 101 stops the operation of the cooling fan 450 by turning off the cooling fan 450 and causes the folding processing controller 430 to set the feeding path of the pressure-bonding postcard sheet to the folding processing path 413 (S5*a*).

Figure 8:
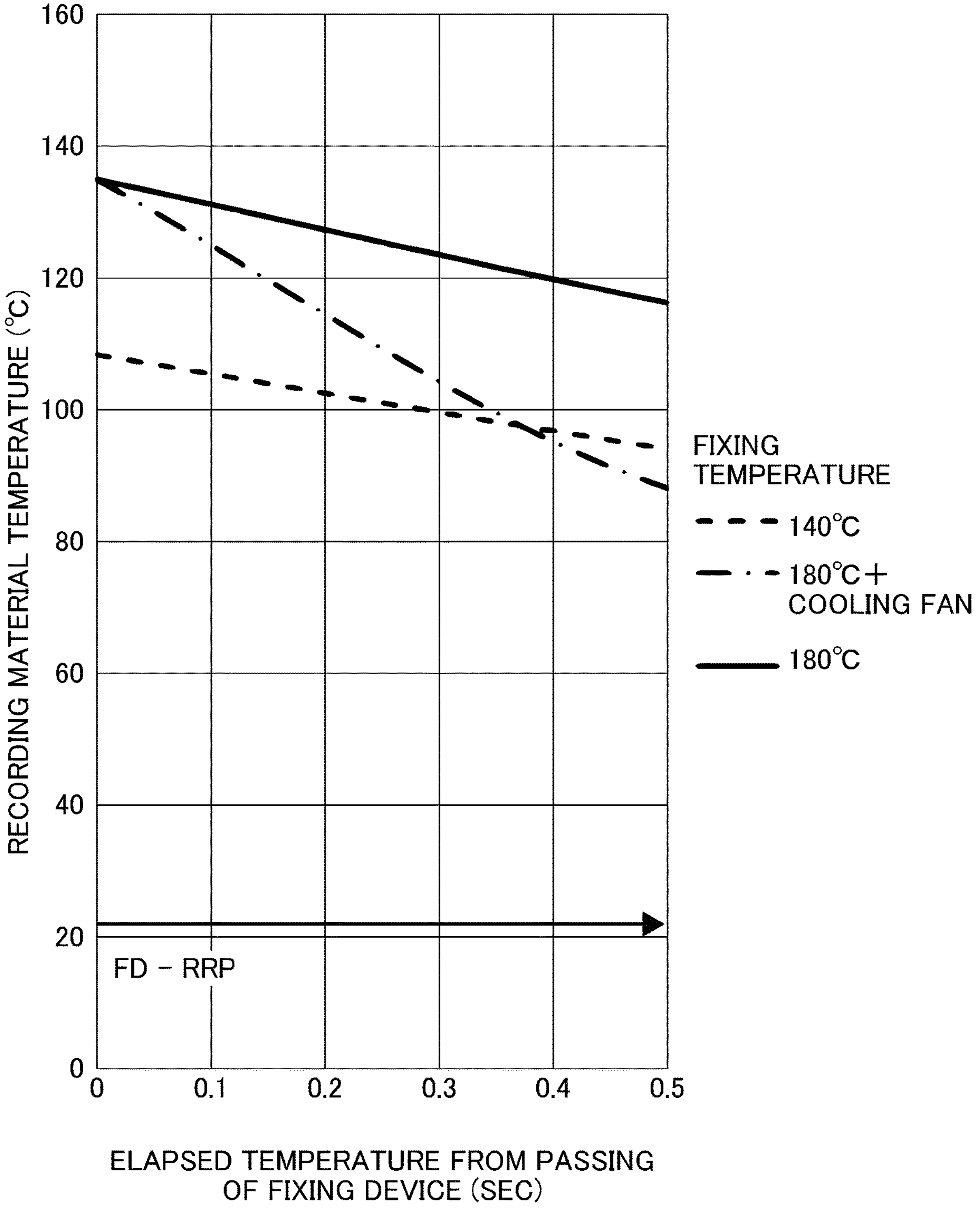
FIG. 8 is a graph showing a temperature change of a recording material by a cooling fan.

Here, an example of a change in temperature of the recording material S depending on an elapsed time from passing of the fixing device 8 and depending on operation on non-operation of the cooling fan 450 is shown in FIG. 8. As can be understood from FIG. 8, in the case where the cooling fan 450 is operated, compared with the case where the cooling fan 450 is not operated, the temperature of the recording material S can be lowered until the recording material S reaches the registration roller pair 405. For example, in the case where the cooling fan 450 is operated at the fixing temperature of "180° C.", not only the temperature of the recording material S is more lowered than in the case where the cooling fan 450 is not operated at the fixing temperature of "180° C.", but also the temperature of the recording material S is capable of being made lower than in the case where the cooling fan 450 is not operated at the fixing temperature of "140° C.".

In the case of this embodiment, from passing of the pressure-bonding postcard sheet through the fixing device 8 until the pressure-bonding postcard sheet reaches the pressure-bonding portion 640, the cooling fan 450 is capable of cooling the recording material S during feeding so that the temperature of the pressure-bonding postcard sheet can be lowered to"15° C. 80° C.". Thus, the pressure-bonding postcard sheet is pressure-bonded by the pressure-bonding portion 640 after being cooled, so that the pressure-bonding postcard with a proper pseudo adhesive force is prepared.

As described above, in this embodiment, the folding processing apparatus 400 is provided with the cooling fan 450, and the cooling fan 450 is operated in the case where the temperature of the pressure-bonding postcard sheet becomes high, so that the pressure-bonding postcard sheet passed through the fixing device 8 is cooled by the cooling fan 450. Thus, the pressure-bonding postcard sheet is cooled forced by the cooling fan 450 after passed through the fixing device 8, whereby the temperature of the pressure-bonding postcard sheet becomes a temperature at which a proper pseudo adhesive force can be obtained during the pressure-bonding by the pressure-bonding apparatus 600. Accordingly, it is possible to prepare the pressure-bonding print with the proper pseudo adhesive force.

Incidentally, in this embodiment, as an example, a method of turning on and off the cooling fan 450 was described, but the present invention is not limited thereto. For example, in the case where the fixing temperature is 150° C., the cooling fan 450 may be driven at a first driving speed, and in the case where the fixing temperature is 180° C., the cooling fan 450 may be driven at a second driving speed faster than the first driving speed. By increasing the driving speed, the pressure-bonding postcard sheet can be more cooled, so that the temperature of the pressure-bonding postcard sheet can be lowered.

Incidentally, in the above-described second embodiment, the cooling fan 450 was used for cooling the pressure-bonding postcard sheet, but is not limited thereto if the surface of the recording material S having the pressure-sensitive adhesive layer, fed along the first passage portion 421 can be cooled. For example, the pressure-bonding postcard sheet may be cooled by a cooling roller pair contacting the pressure-bonding postcard sheet. In this case, the cooling roller pair includes a pair of metal rollers provided so as to be contactable to and separable from the pressure-bonding postcard sheet, and the pair of metal rollers nips the fed pressure-bonding postcard sheet, so that heat of the pressure-bonding postcard sheet is dissipated through the pair of metal rollers. A contact pressure of the pair of metal rollers is a pressure to the extent that the pseudo adhesive force by the pressure-sensitive adhesive layer is not exhibited. Further, as in the first embodiment, in the folding processing apparatus 400, the second passage portion 422 is provide, and the cooling fan 450 may be provided so as to cool the recording material S conveyed along the second passage portion 422.

Third Embodiment

When a continuous image forming job for preparing pressure-bonding postcards by continuously forming toner images on several tens to several hundreds of pressure-bonding postcard sheets is carried out, by heat of the pressure-bonding postcard sheets heated by the fixing device 8, in the pressure-bonding apparatus 600, a temperature of the pressure-bonding roller pair 601 increases. When the temperature of the pressure-bonding roller pair 601 increases, a temperature of the pressure-sensitive adhesive layer increases during pressure-bonding of the pressure-bonding postcard, so that there is a liability that a pressure-bonding postcard high in pseudo adhesive force is prepared.

In FIG. 9, a result of evaluation of the pseudo adhesive force when the temperature of the pressure-bonding roller pair 601 (specifically the upper roller 601*a* is changed in the case where cooling of pressure-bonding postcard sheets (for example, "POSTEX (three-fold)") by the second passage portion 422 or the cooling fan 450 is not performed at a fixing temperature of "150° C." of the fixing device 8 is shown. Incidentally, in discrimination of the pseudo adhesive force shown in FIG. 9, "○" mark shows that the pseudo adhesive force is appropriate, and "x" mark shows that the pseudo adhesive force is not appropriate. In this embodiment, "40 N/m to 60 N/m" is a range of proper pseudo adhesive force.

As can be understood from FIG. 9, in the "POSTEX (three-fold)", the toner peeling did not occur even at a temperature of "40° C. for the pressure-bonding roller pair 601 ("○" mark), and in the case where the temperature of the pressure-bonding roller pair 601 is "50° C." or more, the pseudo adhesive force was excessively strong, so that re-peeling was difficult ("x" mark).

Therefore, in the third embodiment, as shown in FIG. 1, the thermistor 602 as a temperature detecting portion for detecting the temperature of the upper roller 601*a* is provided. Then, depending on a detection temperature of the thermistor 602, a part of the feeding path of the recording material S in the folding processing apparatus 400 was switched to either one of the first feeding path and the second feeding path which are described above. A pressure-bonding print setting processing in the third embodiment will be described using FIG. 10 while making reference to FIGS. 1 and 2. Incidentally, in the following description, processes similar to the processes of the pressure-bonding print setting processing (see FIG. 4) in the first embodiment are represented by adding the same step numbers, and will be briefly described or omitted from description.

Figure 10:
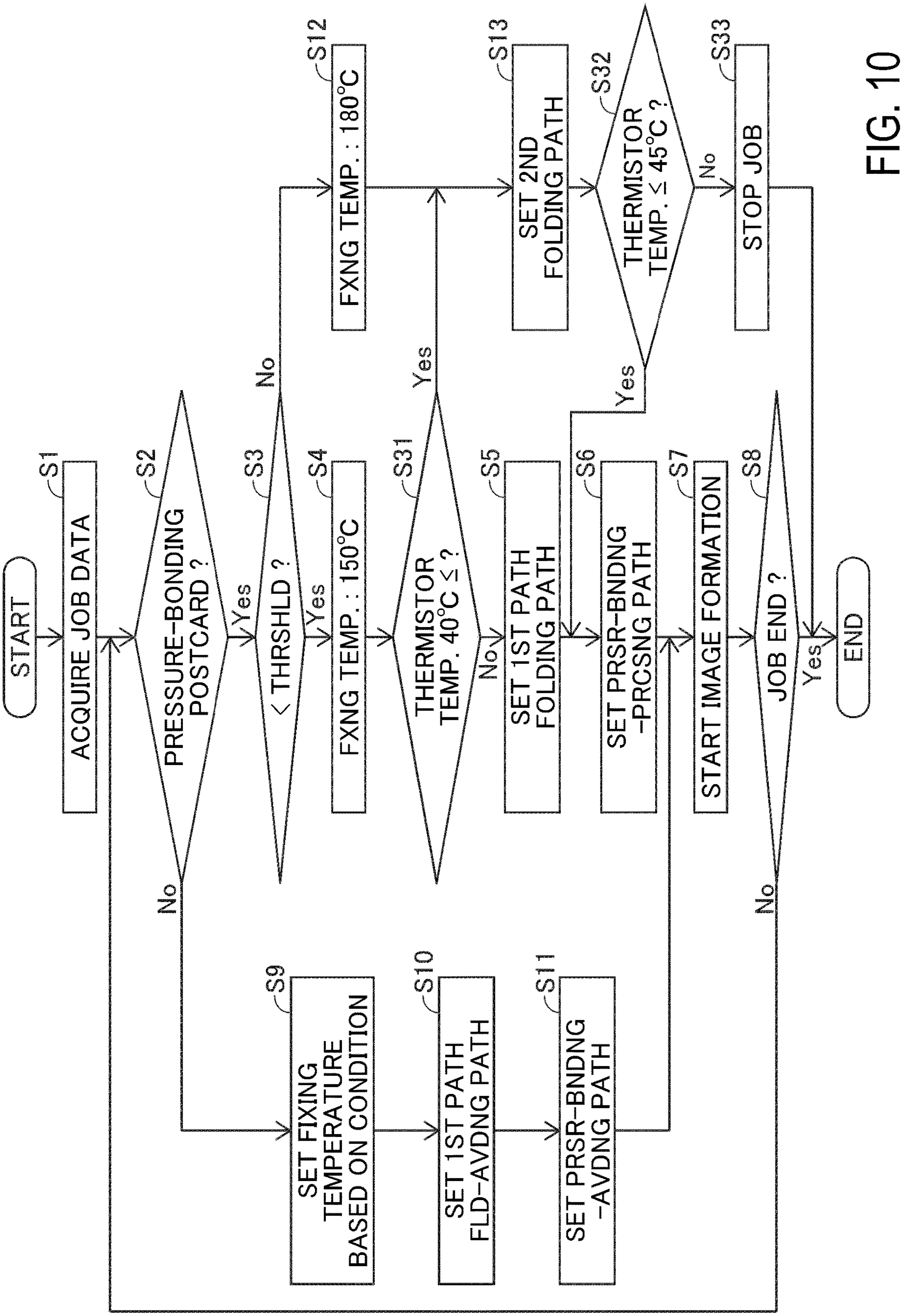
FIG. 10 is a flowchart showing pressure-bonding print setting processing in a third embodiment.

As shown in FIG. 10, in the case where the basis weight of the pressure-bonding postcard sheet is smaller than the threshold (for example, 129 $g/m^2$) (Yes of S3), the main controller 101 sets the fixing temperature of the fixing device 8 to "150° C." (first temperature) (S4). Then, the main controller 101 discriminates whether or not the detection temperature of the upper roller 601*a* detected by the thermistor 602 is a predetermined temperature "40° C." or more (S31). In the case where the detection temperature of the upper roller 601*a* is lower than "40° C." (first predetermined temperature) (No of S31), the main controller 101 causes the folding processing controller 430 to set the feeding path of the pressure-bonding postcard sheet to the first passage portion 421 and the folding processing path 413, i.e., the first feeding path (S5), and causes the pressure-bonding processing controller 630 to set the feeding path of the pressure-bonding postcard sheet to the pressure-bonding processing path 610 (S6). Then, the main controller 101 carries out the processing of the steps S7 and S8 described above.

In the case where the detection temperature of the upper roller 601*a* is "40° C." or more (Yes of S31), the main controller 101 causes the folding processing controller 430 to set the feeding path of the pressure-bonding postcard sheet to the second passage portion 422 and the folding processing path 413, i.e., the second feeding path (S13). Then, the main controller 101 discriminates whether or not the detection temperature of the upper roller 601*a* detected by the thermistor 602 is "45° C." or less (S32). In the case where the detection temperature of the upper roller 601*a* is higher than "45° C." (second predetermined temperature) (No of S32), the main controller 101 discriminates that a proper pseudo adhesive force cannot be obtained due to a temperature increase of the upper roller 601*a*, and then stops the image forming job during execution (S33), and ends the "pressure-bonding print setting processing". Incidentally, in this case, it is preferable that for example, a message to the effect that the image forming job is stopped is displayed on the operating portion 700 or an unshown external device or the like, and thus the user can be notified of the stop of the image forming job.

In the case where the detection temperature of the upper roller 601*a* is "45° C." or less (Yes of S32), the main controller 101 causes the pressure-bonding processing controller 630 to set the feeding path of the pressure-bonding postcard sheet to the pressure-bonding processing path 610 (S6), and then starts the image forming processing (S7).

On the other hand, in the case where the basis weight of the pressure-bonding postcard sheet is the threshold or more (No of S3), the main controller 101 sets the fixing temperature of the fixing device 8 to "180° C." (S12). Then, the main controller 101 causes the folding processing controller 430 to set the feeding path of the pressure-bonding postcard sheet to the second passage portion 422 and the folding processing path 413 (S13). Then, the main controller 101 discriminates whether or not the detection temperature of the upper roller 601*a* detected by the thermistor 602 is "45° C." or less (S32). As described above, in the case where the detection temperature of the upper roller 601*a* is larger than "45° C. (No of S32), the main controller 101 stops the execution of the image forming job (S33).

As described above, according to the third embodiment, even in the case where the continuous image forming job for preparing the pressure-bonding postcards by continuously forming the toner images on the pressure-bonding postcard sheets is executed, it is possible to prepare the pressure-bonding postcards each with a proper pseudo adhesive force.

Incidentally, in the above-described third embodiment, the temperature of the pressure-bonding roller pair 601 is detected by the thermistor 602, but the present invention is not limited thereto if the temperature of the pressure-sensitive adhesive layer of the pressure-bonding postcard sheet is capable of being predicted to becomes excessively high. For example, in the case where many pressure-bonding postcards are prepared, by the heat of the pressure-bonding postcards heated by the fixing device 8, similarly as in the case of the pressure-bonding roller pair 601, the first folding roller pair 407, the second setting roller pair 408, and the third folding roller pair 410 of the folding processing apparatus 400 are capable of increasing in temperature. Therefore, at least one of temperatures of the first folding roller pair 407, the second folding roller pair 408, and the third folding roller pair 410 is detected, and then the "pressure-bonding print setting processing" in the third embodiment described above may be executed using a detection result thereof instead of the temperature of the pressure-bonding roller pair 601. Or, the temperature of the pressure-bonding postcard sheet is measured on the feeding path, along which the pressure-bonding postcard sheet is conveyed, from the fixing device 8 to the pressure-bonding roller pair 601, and a detection result thereof may also be used instead of the temperature of the pressure-bonding roller pair 601.

Another Embodiment

Incidentally, in the above-described embodiments, the image forming systems 1X and 2X in which the pressure-bonding processing apparatus 200 is connected as a different casing to the apparatus main assembly of the image forming apparatus 100 were described as an example, but the pressure-bonding processing apparatus 200 may be provided inside the apparatus main assembly (inside the same casing) of the image forming apparatus 100. In that case, the main controller 101 also operates as the folding processing controller 430 and the pressure-bonding processing controller 630, which are described above.

According to the present invention, in the case where the toner images are fixed on the recording material having the pressure-sensitive adhesive layer on the surface thereof, and the recording material on which the toner images are fixed is pressure-bonded and thus the pressure-bonding print is prepared, it is possible to prepare the pressure-bonding print with the proper pseudo adhesive force.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-145109 filed on Sep. 13, 2022, which is hereby incorporated by reference herein in its entirety.

What is claimed is:

1. An image forming system comprising:

an image forming apparatus including an image forming unit capable of forming a toner image on a recording material having a pressure-sensitive adhesive layer on a surface thereof and a fixing unit configured to fix the toner image on the recording material;

a folding processing portion provided on a side downstream of the image forming apparatus with respect to a feeding direction of the recording material and configured to fold the recording material, on which the toner image is fixed by the fixing unit, in a manner such that the surface where the pressure-sensitive adhesive layer is an inside of the recording material; and a pressure-bonding portion provided on a side downstream of the folding processing portion with respect to the feeding direction and configured to pressure-bond the recording material folded by the folding processing portion, wherein a first recording material having a first basis weight is fixed at a first temperature by the fixing unit and then is pressure-bonded by the pressure-bonding portion after a lapse of a first period, wherein a second recording material having a second basis weight is fixed at a second temperature by the fixing unit and then is pressure-bonded by the pressure-bonding portion after a lapse of a second period, and wherein the second basis weight is larger than the first basis weight, the second temperature is higher than the first temperature, and the second period is longer than the first period.

2. An image forming apparatus according to claim 1, further comprising:

a first feeding path in which a length of a feeding passage from the fixing unit to the pressure-bond portion through the folding processing portion is a first length, and a second feeding path in which a length of a feeding passage is a second length longer than the first length, wherein the first recording material is fed along the first feeding path, and the second recording material is fed along the second feeding path.

3. An image forming system according to claim 1, wherein the first recording material is fixed by the fixing unit and then is fed at a first feeding speed, wherein the second recording material is fixedly by the fixing unit and then is fed at a second feeding speed, and wherein the second feeding speed is slower than the first feeding speed.

4. An image forming system according to claim 1, wherein the first recording material is fixed by the fixing unit, and thereafter, feeding of the first recording material is stopped for a third period and then the first recording material is fed to the pressure-bond portion, wherein the second recording material is fixed by the fixing unit, and thereafter, feeding of the second recording material is stopped for a fourth period and then the second recording material is fed to the pressure-bonding portion, and wherein the fourth period is longer than the third period.

5. An image forming system according to claim 2, wherein the first feeding path includes a first passage portion along which the recording material is fed and the folding processing portion on a side downstream of the first passage portion with respect to the feeding direction, wherein the second feeding path includes a second passage portion along which the recording material is fed and the feeding processing portion on a side downstream of the second passage portion with respect to the feeding direction, and wherein the second passage portion is longer than the first passage portion in length of a passage along which the recording material is fed.

6. An image forming system comprising:

an image forming apparatus including an image forming unit capable of forming a toner image on a recording material having a pressure-sensitive adhesive layer on a surface thereof and a fixing unit configured to fix the toner image on the recording material;

a folding processing portion provided on a side downstream of the image forming apparatus with respect to a feeding direction of the recording material and configured to fold the recording material, on which the toner image is fixed by the fixing unit, in a manner such that the surface where the pressure-sensitive adhesive layer is an inside of the recording material;

a pressure-bonding portion provided on a side downstream of the folding processing portion with respect to the feeding direction and configured to pressure-bond the recording material folded by the folding processing portion, and a cooling unit configured to cool the recording material in a feeding passage from the fixing unit to the pressure-bonding portion through the folding processing portion, wherein a first recording material having a first basis weight is fixed at a first temperature by the fixing unit, and thereafter, a first cooling operation is performed by the cooling unit and then the first recording material is pressure-bonded by the pressure-bonding portion, wherein a second recording material having a second basis weight is fixed at a second temperature by the fixing unit, and thereafter, a second cooling operation is performed by the cooling unit and then the second recording material is pressure-bonded by the pressure-bonding portion, wherein the second basis weight is larger than the first basis weight and the second temperature is higher than the first temperature, and wherein in the first cooling operation, the cooling unit is driven at a first driving speed or is not driven, and in the second cooling operation, the cooling unit is driven at a second driving speed faster than the first driving speed.

7. An image forming system according to claim 6, wherein the cooling unit is a fan for blowing air toward the recording material.

8. An image forming system comprising:

an image forming apparatus including an image forming unit capable of forming a toner image on a recording material having a pressure-sensitive adhesive layer on a surface thereof and a fixing unit configured to fix the toner image on the recording material;

a folding processing portion provided on a side downstream of the image forming apparatus with respect to a feeding direction of the recording material and configured to fold the recording material, on which the toner image is fixed by the fixing unit, in a manner such that the surface where the pressure-sensitive adhesive layer is an inside of the recording material; and a pressure-bonding portion provided on a side downstream of the folding processing portion with respect to the feeding direction and configured to pressure-bond the recording material folded by the folding processing portion, wherein the pressure-bonding portion includes a first rotatable member, a second rotatable member configured to form a nip in which the recording material is pressure-bonded by being fed and nipped, in cooperation with the first rotatable member, and a temperature detecting portion configured to detect a temperature of the first rotatable member, wherein a first recording material having a first basis weight is fixed at a first temperature by the fixing unit and then is pressure-bonded by the pressure-bonding portion after a lapse of a first period, wherein a second recording material having a second basis weight is fixed at a second temperature by the fixing unit and then is pressure-bonded by the pressure-bonding portion after the lapse of the first period in a case that the temperature detected by the temperature detecting portion is a first detection temperature, and is fixed at the second temperature by the fixing unit and then is pressure-bonded by the pressure-bonding portion after a lapse of a second period in a case that the temperature detected by the temperature detecting portion is a second detection temperature, and wherein the second basis weight is larger than the first basis weight, the second temperature is higher than the first temperature, the second detection temperature is higher than the first detection temperature, and the second period is longer than the first period.

9. An image forming system according to claim 8, wherein in a case that the temperature detected by the temperature detecting portion is a third detection temperature higher than the second detection temperature, an image forming job during execution is stopped.

* * * * *